C. F. VERRELL.
PROCESS OF SEPARATING DUST AND OTHER MATERIALS FROM DUST LADEN AIR, AND A DUST COLLECTOR FOR CARRYING OUT SAID PROCESS.
APPLICATION FILED JULY 2, 1908.
964,717.
Patented July 19, 1910.
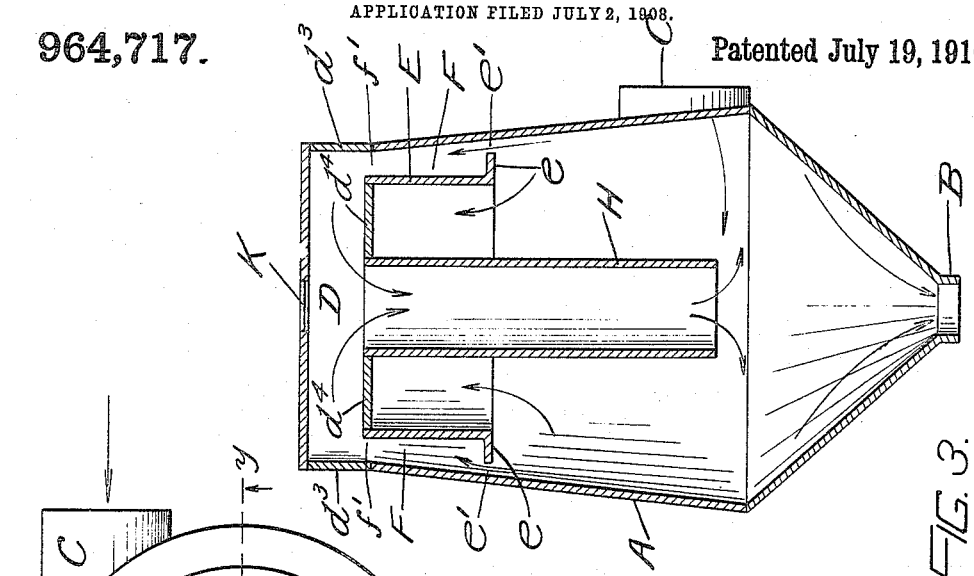
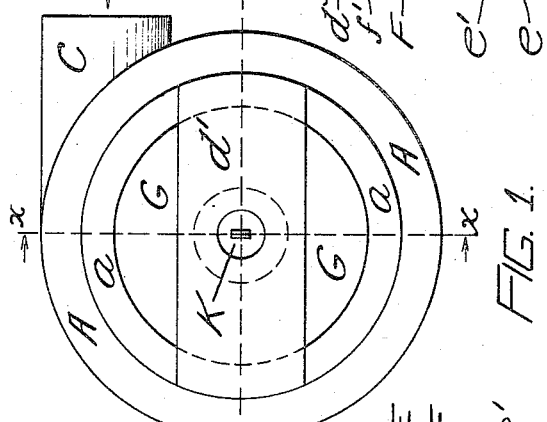
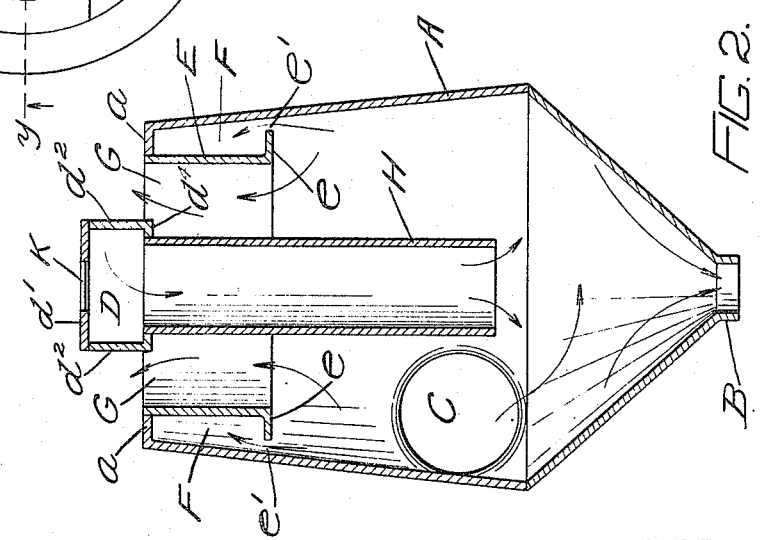
WITNESSES
INVENTOR
Charles F. Verrell
BY
W. C. Margeson
ATTORNEY

UNITED STATES PATENT OFFICE.

CHARLES F. VERRELL, OF GRAND RAPIDS, MICHIGAN.

PROCESS OF SEPARATING DUST AND OTHER MATERIALS FROM DUST-LADEN AIR, AND A DUST-COLLECTOR FOR CARRYING OUT SAID PROCESS.

964,717.         Specification of Letters Patent.    Patented July 19, 1910.

Application filed July 2, 1908. Serial No. 441,654.

*To all whom it may concern:*

Be it known that I, CHARLES F. VERRELL, a citizen of the United States, residing at Grand Rapids, in the county of Kent and State of Michigan, have invented a new and useful process of separating dust and other materials from dust-laden air and a dust-collector for carrying out said process, of which the following is a specification.

My invention relates to improvements in centrifugal dust-collectors, wherein the separation of the dust and the other materials from the dust-laden air is effected by a whirling or vortical motion of the dust-laden air within the machine and to the process whereby such separation is carried out.

In all dust-collectors, it is exceedingly desirable that the fine residual dust, which is invariably present to a greater or less extent, should be collected and not allowed to escape through the air-outlet.

One of the objects of my invention is, first, to provide a process whereby the partially purified air carrying this fine residual dust would be divided into two streams, one carrying the fine dust, the other being purified air which is allowed to escape into the atmosphere, while the stream of air carrying the dust would be returned to a point in the collector where the dust would be precipitated through the action of gravity; and, second, to provide means whereby the foregoing process or method could be carried out, and the fine residual dust separated out from the transporting air and collected.

Another object is to provide means for overcoming the back pressure due to the "intake" of air through the air outlet of the dust-collector. By "intake" of air I refer to the current of air which flows into a centrifugal dust-collector through the air-outlet, due to the whirling motion of the air within the separator and the vortical motion of the purified air as it escapes through the air-outlet.

Further objects will more definitely appear from the detailed description to follow.

The invention is clearly defined and pointed out in the claims.

A structure embodying the features of my invention and capable of carrying out the process herein described and claimed is illustrated in the accompanying drawings, forming a part of this specification, in which—

Figure 1 is a top view of my improved dust-collector and separator. Fig. 2 is a sectional view taken on line $x$—$x$ of Fig. 1. Fig. 3 is a sectional view taken on line $y$—$y$ of Fig. 1.

All sectional views are taken looking in the direction of the little arrows at the ends of the section lines.

Similar letters of reference refer to similar parts throughout the several views.

My invention is adapted to be used with all forms of centrifugal dust-collectors—that is, dust-collectors wherein the separation of the dust and other materials in the air is effected by giving to the transporting air a vortical or whirling motion within the collector.

In the form of dust-collector illustrated in the accompanying drawings, A represents the outer casing, the lower part being conical while the upper part is shaped like the frustum of a cone. At the apex of the lower part of the casing is the dust-outlet B. The dust-inlet C is a tangential opening in the casing A near the base of the frustum-shaped part, and so placed that the incoming dust-laden air will have a whirling or vortical motion within the casing. The top of the casing A is provided with two inwardly extending flanges $a$ $a$, each flange extending part way around the periphery of the top and opposite to each other. Superimposed upon the top of the collector and secured thereto is the oblong chamber D, having a top $d'$, sides $d^2$ $d^2$, ends $d^3$ $d^3$ and bottom $d^4$. The chamber is so placed that the sides $d^2$ $d^2$ are contiguous with the ends of the flanges $a$ $a$, and the ends $d^3$ $d^3$ form extensions of the casing A. The central line of the chamber is coincident with the diameter of the top.

Means are provided for dividing the partially purified air into a plurality of streams, one stream carrying the fine dust, another stream being the purified air. In the form preferred by me, said means consist of the cylindrical tubular guard E, open at each end, the upper end of which is secured to the inner edges of the flanges $a$, $a$, so that the guard E is suspended within the collector in axial alinement therewith. The lower end of the guard E is provided with the flange $c$, which extends outwardly toward the casing A, forming the passageway $e'$ therebetween.

The guard E communicates with the atmosphere by the air-outlets or openings G G formed by the lower edges of the chamber D and the top periphery of the guard. As the guard E is of smaller diameter than the casing A, there is formed between the casing A, the guard E, and the flange e, a chamber F extending around the guard E. This chamber F is connected with the lower part of the dust-collector by the passageway $e'$ and with the chamber D by the passageways $f^1 f^1$. I do not, however, desire to be confined to the cylindrical form of tubular guard, as shown, for other forms of guards may be used equally as well.

Suspended within the tubular guard E in axial alinement therewith and secured to the bottom $d^4$ of the chamber D is the tube H which extends downwardly to a point substantially opposite the dust-inlet C—that is, to a point where the motion of the air within the casing is practically at a minimum, as will be hereinafter shown. This tube H is open at each end, and forms a means of communication from the chamber D to the lower part of the dust-collector. The chamber D is also provided with a cover K inserted in the top $d'$ of the chamber. This cover is adapted to be opened so that the interior of the collector can be inspected.

In the operation of my improved dust-collector, the dust-laden air enters the dust-collector through the dust-inlet C. By reason of its velocity and tangential entrance, this dust-laden air whirls around inside the casing, forming a sort of vortex within the collector. The heavier materials carried by the air will follow around inside the casing and through the force of gravity, will be carried downwardly to the dust-outlet B. It is, however, impossible to separate out all of the dust from the dust-laden air by giving it such a whirling or vortical motion, for the fine dust, which I call the "residual dust", tends to escape through the air outlets. My invention is particularly adapted to overcome this tendency to escape, and to separate out this dust from the air. As the stream of air carrying this residual dust whirls around within the collector, it tends to rise so as to escape through the air-outlets by virtue of the pressure of the incoming air. Owing to the greater weight of the particles of dust to that of the air, the centrifugal force causes the dust to follow closely around within the wall of the casing, forming a sort of layer while the purified air forms another layer nearer the center of the collector. There is, however, no line of demarcation between the two layers. As this air moves upwardly, the layer of air carrying the residual dust passes through the passageway $e'$ into the chamber F, while the layer of purified air passes upwardly within the tubular guard E and out through the air-outlets G G. The stream of air, with the accompanying residual dust, within the chamber F passes upwardly through the passageway $f^1$, into the chamber D, thence it is drawn into the tube H where it passes downwardly into the lower part of the collector. This passage of the air and dust from the chambers F and D into the tube H is due to the pressure of the incoming dust-laden air through the dust-inlet C, and to the rarefaction which is formed at about the lower end of the tube H by the vortical motion of the dust-laden air within the collector. The vortical motion of the incoming dust-laden air produces an area of rarefication within the vortical whirl in said collector. The degree of rarefication, however, being governed by the pressure of the incoming air and the regulation of the discharge of the material through the furnace-feeder pipes, can therefore be controlled by the operator to produce the results desired.

When the stream of air, carrying the residual dust reaches the lower end of the tube H, it has practically no vortical motion while the velocity has decreased to such a degree that the particles of dust will drop and be deposited through the action of gravity into the lower part of the collector. This deposition or precipitation of the dust is due to the fact that as the air and dust pass out through the lower end of the tube H, gravity will tend to overcome any tendency the dust particles may have to remain suspended in the air owing to the decreased velocity of the latter. The greater part of the dust particles therefore settle down into the lower part of the collector and are ejected through the dust outlet B while the air relieved of these particles will pass outwardly and upwardly around the tube H. The remaining particles carried by the air as it moves upwardly are further subjected to the action of gravity and, hence, tend to settle down in the lower part of the collector. In the ordinary forms of centrifugal dust-collectors, on account of this rarefaction or partial vacuum, there is an "intake" or flow of air inwardly through the air-outlet. This is an undesirable feature as such "intake" requires more power to be used to operate the dust-collector. In my improved form of dust-collector, this "intake" of air is overcome and prevented by the oblong chamber D and by the tubular guard E.

I do not wish to be confined to the form of dust-collector shown, as my invention of the means whereby the partially-purified air is divided into a plurality of streams, one stream carrying the residual dust and then diverting this stream so that the dust is precipitated, is applicable to all the various types of centrifugal dust-collectors.

While I have described and claimed an apparatus capable of carrying out the process herein set forth and claimed, it will be obvious to those skilled in the art that various changes, modifications, alterations and substitutions may be made therein, without departing from the spirit of my invention.

What I claim as new, and desire to secure by Letters Patent, is:

1. A dust-collector, comprising a casing provided with a dust-outlet, an air-outlet, and a dust-inlet so arranged that the incoming dust-laden air will assume a vortical whirl within said casing, a chamber connected to said casing, a tubular guard arranged within said casing to divert the air carrying the fine residual dust to said chamber, and a conducting pipe connecting said chamber with the axial interior of said casing, the lower end of said pipe opening into the center of the said vortical whirl.

2. A dust-collector, comprising a casing provided with a dust-outlet, an air-outlet, and a dust-inlet so arranged that the incoming dust-laden air will assume a vortical whirl within said casing, a tubular guard to divert the air carrying the residual dust, and means for conducting said residual dust to a point within and in the axis of said vortical whirl.

3. A dust-collector, comprising a casing provided with a dust-outlet, an air-outlet, and a dust-inlet so arranged that the incoming dust-laden air will assume a vortical whirl within said casing, a chamber connected to said casing, an instrumentality to divert the air carrying the fine residual dust to said chamber, and means for conducting said fine residual dust from said chamber to a point within and in the axis of said vortical whirl.

4. A dust-collector, comprising suitable means for causing the incoming dust-laden air to assume a vortical whirl therein and to separate into a plurality of streams, one stream carrying the heavier materials, another carrying the fine residual dust, means for decreasing the velocity of this latter stream, and means for returning it to a point within and in the axis of said vortical whirl.

5. A dust-collector, comprising a casing provided with a dust-outlet, an air-outlet, and a dust-inlet so arranged that the incoming dust-laden air will assume a vortical whirl within said casing, a tubular guard arranged to form with said casing an annular chamber, a second chamber secured to the top of said casing and connected with said annular chamber, and a tube connecting said second chamber with the axial interior of said casing, the lower end of said tube opening into the center of said vortical whirl.

6. A dust-collector, comprising means for causing the incoming dust-laden air to assume a vortical whirl therein and to separate out the heavier materials from said air, a tubular guard for dividing the partially purified air carrying the residual dust into a plurality of streams, one stream carrying the said dust, and means for returning the said stream to a point within and in the axis of said vortical whirl.

7. In a dust-collector, having an outer casing provided with a dust-inlet, a dust-outlet and air-outlet, the combination of a tubular guard having a flange around its lower periphery extending outwardly toward said casing, so as to form an annular chamber in communication with said collector between said guard and said casing, a chamber secured to the top of said casing and communicating with said annular chamber, and an open tube secured to the bottom of said second chamber and suspended within said guard and collector.

8. A dust-collector, comprising a casing provided with a dust-outlet, an air-outlet, and a dust-inlet so arranged that the incoming dust-laden air will assume a vortical whirl within said casing, a tubular guard suspended from the periphery of said air-outlet and arranged to form with said casing an annular chamber around said guard, an oblong chamber in diametric alinement with and secured to the top of said casing and in communication with said annular chamber, and an axially-disposed tube connecting said oblong chamber with the interior of said casing, said tube terminating within the rarefied area of said vortical whirl.

9. A dust-collector, comprising a casing provided with a dust-outlet, an air-inlet, and a dust-inlet so arranged that the incoming dust-laden air will assume a vortical whirl within said casing, an instrumentality interposed in the path of the air carrying the residual dust to separate said air into a plurality of streams, one stream carrying the said dust, a chamber for receiving said latter stream, and conducting means from said chamber opening axially into the rarefied area of said vortical whirl.

10. The process of separating the fine residual dust in a centrifugal dust-collector from the transporting air, said process consisting in conducting the said air and dust to a point within and in the axis of the vortical whirl in said collector and precipitating the said dust through the action of gravity at said point.

11. The process of separating the dust and other materials from the dust-laden air in a centrifugal dust-collector, which consists in separating the dust-laden air into a plurality of streams, one stream carrying the heavier materials, another carrying the lighter or fine residual dust, then decreasing the velocity of this latter stream and returning it to a point within and in the axis of the vortical whirl in said collector, and precipitating the dust through the action of gravity at said point.

12. The process of separating out the fine residual dust in a centrifugal dust-collector, which consists in decreasing the velocity of said dust and conducting it to a point within and in the axis of the vortical whirl in said collector and precipitating the said dust through the action of gravity at said point.

13. The process of separating dust and other materials from dust-laden air, said process consisting in causing the dust-laden air to assume a vortical whirl to separate out the heavy materials, then conducting the fine residual dust to a point within and in the axis of said vortical whirl and precipitating the dust through the action of gravity.

14. The process of separating dust and other materials from dust-laden air, said process consisting in first causing said dust-laden air to assume a vortical whirl to separate out the heavier materials, then conducting the air carrying the fine dust to the rarefied area within said vortical whirl and precipitating said dust through the action of gravity.

15. The process of separating dust and other materials from dust-laden air, said process consisting in first causing said dust-laden air to assume a vortical whirl to separate out the heavier materials, then conducting the air carrying the fine dust to a point within and in the axis of said whirl, precipitating part of said dust at that point through the action of gravity, and causing the air carrying the remaining dust to move upwardly above said point for further separation through the action of gravity.

16. The process of separating dust and other materials from dust-laden air, said process consisting in first causing said dust-laden air to assume a vortical whirl to separate out the heavier materials, then decreasing the velocity of the air carrying the fine residual dust and returning it to a point within and in the axis of said vortical whirl and precipitating said dust at that point through the action of gravity.

17. The process of separating dust and other materials from dust-laden air, said process consisting in first causing said dust-laden air to assume a vortical whirl to separate out the heavier materials, then decreasing the velocity of the air carrying the fine dust and returning it to a point within and in the axis of said whirl, precipitating part of said dust at that point through the action of gravity, and causing the air carrying the remaining dust to move upwardly above said point for further separation through the action of gravity.

18. The process of separating the fine residual dust in a centrifugal dust collector from the transporting air, said process consisting in conducting the said air and dust to the rarefied area within the vortical whirl in said collector and precipitating the said dust through the action of gravity.

19. The process of separating the dust and other materials from dust-laden air, said process consisting in first causing said dust-laden air to assume a vortical whirl to separate out the heavier materials, then conducting the air carrying the fine dust to the rarefied area within said whirl, precipitating part of said dust within said area through the action of gravity and causing the air carrying the remaining dust to move upwardly in said area for further separation through the action of gravity.

20. The process of separating dust and other materials from dust-laden air, said process consisting in first causing said dust-laden air to assume a vortical whirl to separate out the heavier materials, then decreasing the velocity of the air carrying the fine dust and returning it to the rarefied area within said whirl, precipitating part of said dust in said area through the action of gravity, and causing the air carrying the remaining dust to move upwardly in said area for further separation through the action of gravity.

21. In a centrifugal dust-collector, the combination with means for causing incoming dust-laden air to assume a vortical whirl therein for separating the dust-laden air into a plurality of streams, one stream carrying the heavier materials, another stream carrying the fine residual dust, means for decreasing the velocity of this latter stream, and means for conducting it to a point within and in the axis of said vortical whirl where the dust will be precipitated.

22. In a centrifugal dust-collector, the combination with means for causing the incoming dust-laden air to assume a vortical whirl therein to separate out the heavier materials, of means for conducting the air carrying the fine residual dust to the rarefied area within said vortical whirl where said dust will be precipitated.

23. In a centrifugal dust-collector, the combination with means for causing the incoming dust-laden air to assume a vortical whirl therein, of means for separating the dust-laden air into a plurality of streams, one stream carrying the fine residual dust, and means for conducting this latter stream to a point within and in the axis of said whirl where the fine residual dust will be precipitated.

CHARLES F. VERRELL.

Witnesses:
FRED S. TEMPLE,
CORA TIETERNA.